March 3, 1931.  W. B. THIEMANN  1,794,654
ENSILAGE HARVESTER
Filed May 22, 1923      6 Sheets-Sheet 1

Inventor
William B. Thiemann
by Orwig & Hague, Att'ys.

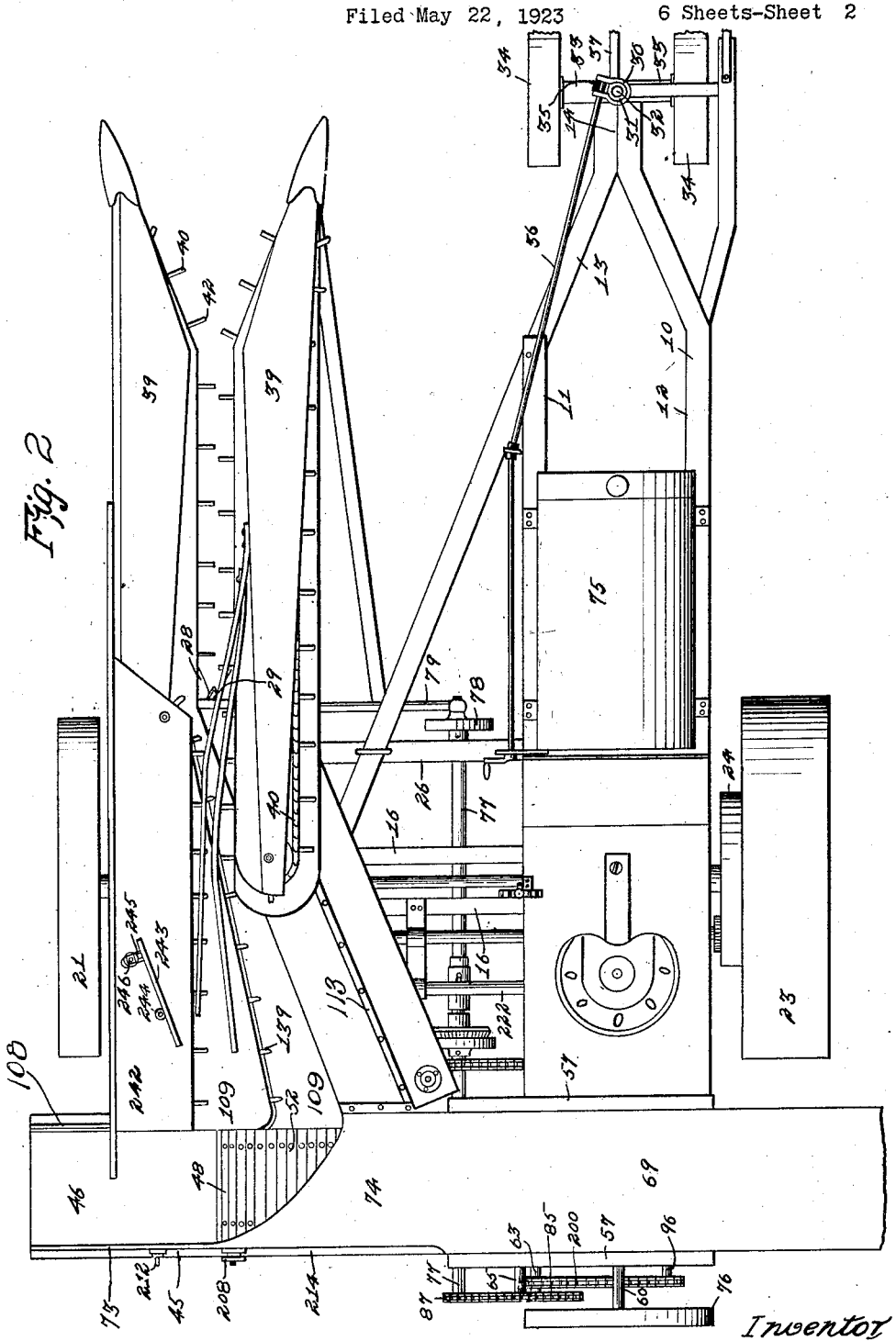

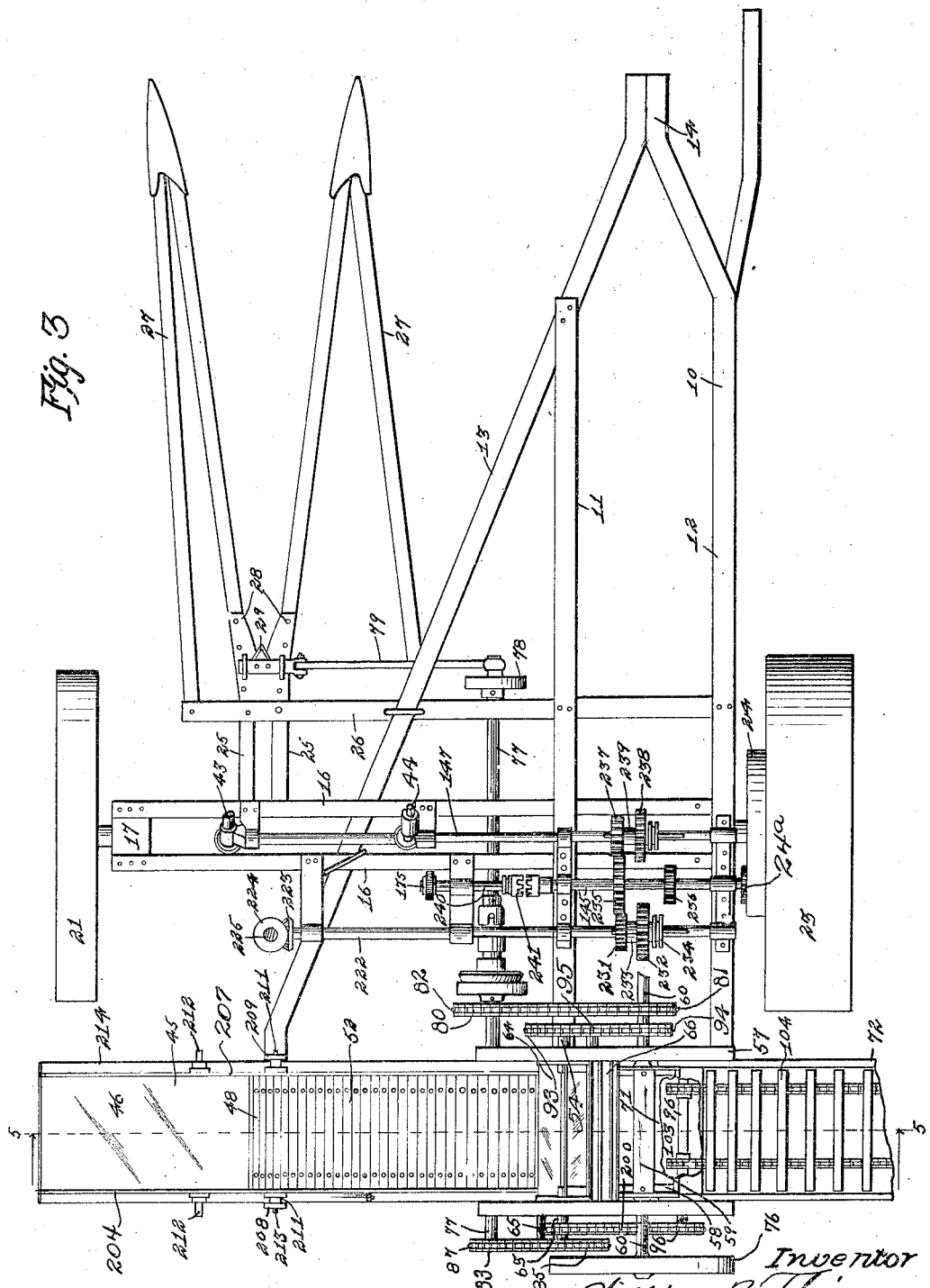

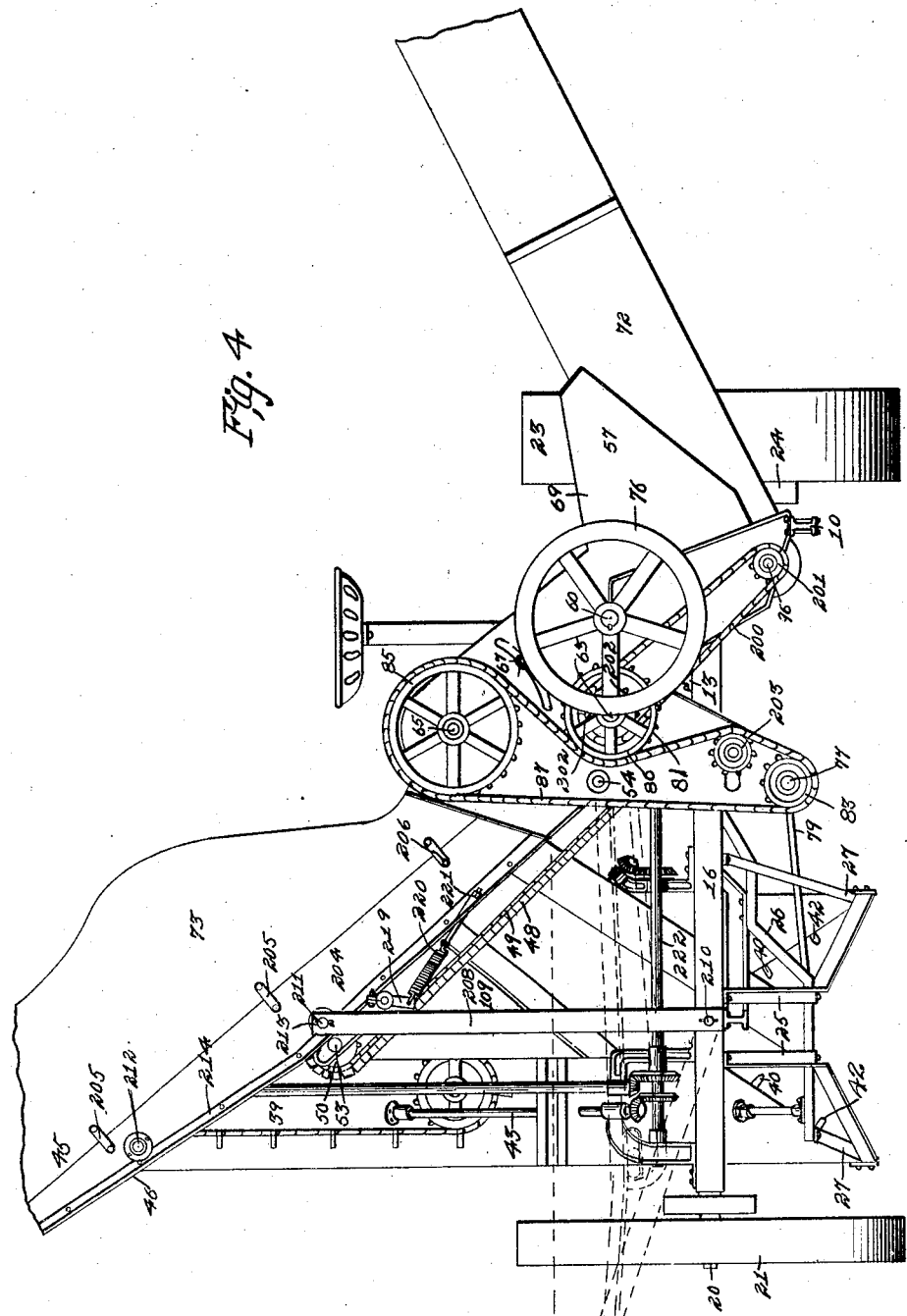

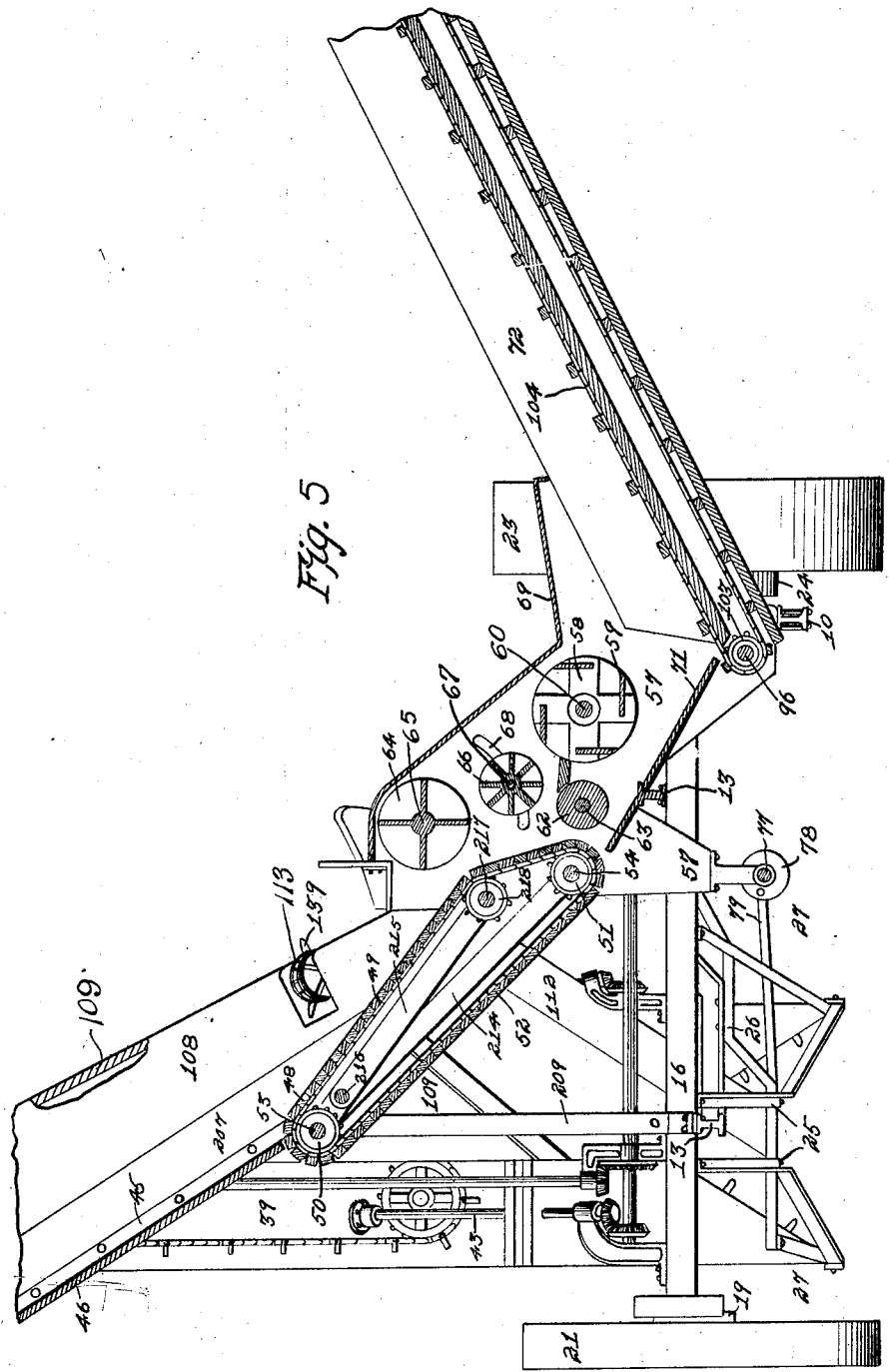

March 3, 1931.  W. B. THIEMANN  1,794,654
ENSILAGE HARVESTER
Filed May 22, 1923  6 Sheets-Sheet 6

Inventor
William B. Thiemann
by Owing & Hague Att'ys

Patented Mar. 3, 1931

1,794,654

UNITED STATES PATENT OFFICE

WILLIAM B. THIEMANN, OF ALBERT CITY, IOWA

ENSILAGE HARVESTER

Application filed May 22, 1923. Serial No. 640,657.

This invention relates to improvements in ensilage harvesters of that type designed to harvest and cut the ensilage in the field and deliver the same to a wagon designed to travel adjacent to one side of the harvester, the harvesting being accomplished as the machine is advanced over the ground surface.

One of the objects of my invention is to provide a number of improvements over my co-pending application for patent filed January 17, 1921, Serial Number 438,004.

I find in actual practice that it is often desirable to use the harvesting machine for the purpose of cutting silage from the shocked corn and the like. By providing means for lowering the outer end of the inclined transverse conveyor to a horizontal position, and making one of the side members of the conveyor detachable, I have provided means whereby the shocked corn may be fed into the conveyor conveniently by an operator standing on the ground, the machine being operated by simply pulling it adjacent to the shock and throwing the fodder into the said transverse conveyor, the machine being operated standing still rather than while being advanced.

A further object is to provide an improvement in said transverse conveyor whereby the fodder or green stalks may be more readily fed to the feeding mechanism of the ensilage cutter.

Another improvement is to provide a variable drive mechanism for the elevating and gathering chains, and whereby the speed of the elevating chains may be varied as well as the speed of the gathering chains. In my previous application the variable speed simply applied to the gathering chains.

A further improvement consists in carrying one of the sets of gathering chains slightly higher than the other set, so that the gathering chains may be operated comparatively close together, and at the same time provide means whereby an ear of corn may pass between them without breaking the chains or slugging the machine.

Another improvement consists in providing means whereby the stalks of corn may be more readily discharged from a vertical position to a transversely inclined position.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my ensilage harvester showing the improvements above referred to.

Figure 2 is a plan view of the same.

Figure 3 is a detail plan view of the supporting frame showing the arrangement of my improved conveyor driving mechanism.

Figure 4 is an end elevation showing the manner in which the transverse conveyor is mounted and the improvements of the same.

Figure 5 is a transverse, sectional view taken on the line 5—5 of Figure 3.

Figure 1:
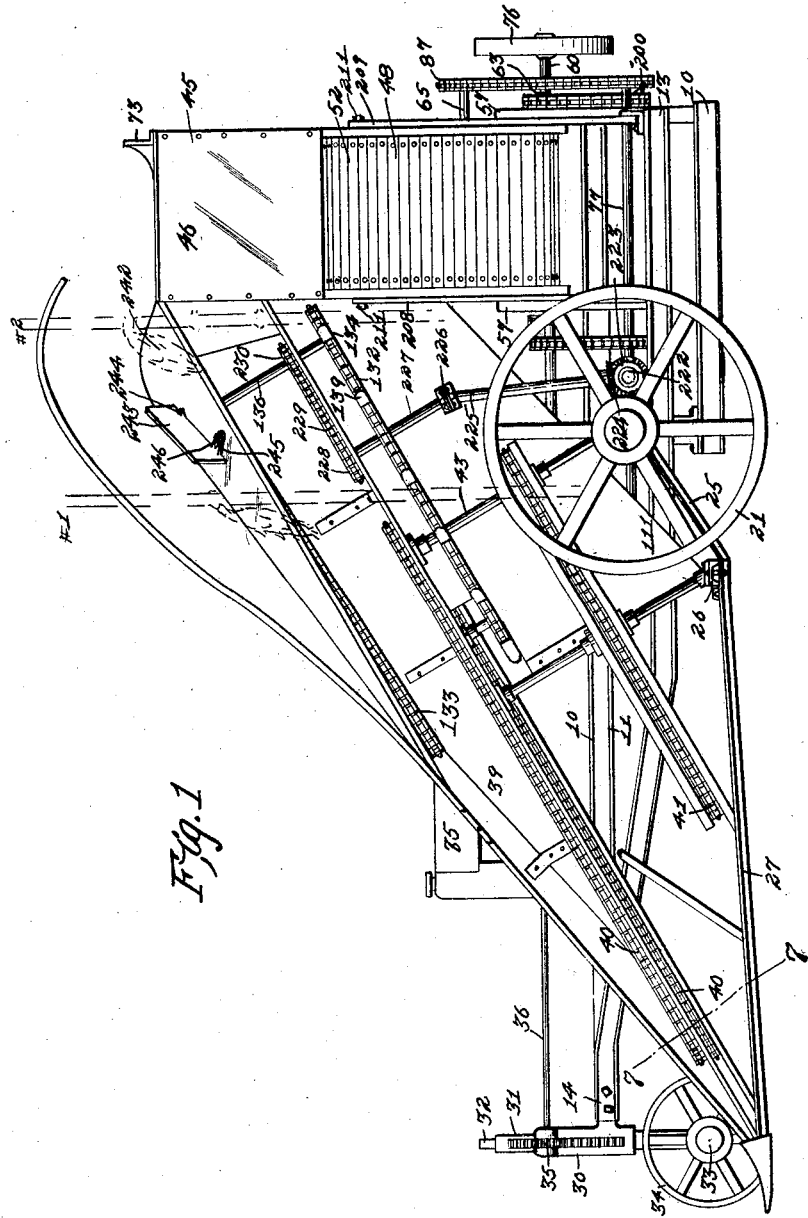

Inasmuch as the present application is simply an improvement over my previous application, it is deemed unnecessary to describe the operation of the complete machine in detail. The present drawings are substantially the same as the previous drawings with the exception of the improvements.

My improved harvester is mounted upon a frame 10 having parallel and longitudinally arranged members 11 and 12 and a diagonally arranged member 13. The forward ends of the members 13 and 12 are secured together at 14.

Secured transversely with the members 11, 12 and 13 is an axle member 16, comprising parallel bars, which at one end have mounted between them a block 17. This block 17 is provided with axle 20 on which is mounted a wheel 21.

Secured to the opposite end of the axle 16 I have provided an axle 22, on which is mounted the bull wheel 23. This bull wheel 23 is provided with an internal gear member 24, the purpose of which will hereinafter be made clear.

Mounted on the axle 16, near the wheel 21, are two forwardly extending frame members 25, having their back ends parallel and their forward ends diverging from each other, the forward ends also extending downwardly. Secured transversely beneath the members 11, 12 and 13 is a member 26, to which the members 25 are secured. The forward end of each of the members 25 is provided with a brace member 27, which is connected to the member 26. The forward end of the members 25 and the branches 27 form a supporting frame for the forward end of the gathering mechanism hereinafter to be described.

The portions of the members 25 just ahead of the members 26 are each provided with a cutter blade 28, arranged in a diagonal and diverging manner, with the rear cutting edges slightly spaced apart. These cutters will cut any scattering stalks in the hill, while the center stalks are designed to be cut by means of a sickle 29 which is slidably mounted to operate transversely with the movement of the stalks between the members 25. This sickle I shall term a harvester cutter, and is of the ordinary construction used in machines of this kind.

The member 14 of the frame 10 is mounted upon the bracket 30, which is designed to receive a slidable rack member 31, said rack member having a shaft 32 pivotally mounted therein. The lower end of the shaft 32 is provided with an axle 33, which is pivotally mounted thereon, each end of the said axle being provided with a wheel 34. The rack 31 is designed to be engaged by a pinion 35. This pinion 35 is provided with a shaft 36 which extends rearwardly.

Secured to the bracket 30 I have provided a hitch bar 37, by which the device may be advanced over the ground. Secured to the members 25 I have provided inclined gathering members comprising boards 39 and conveyor members 40 and 41. Each of said conveyors is provided with laterally extending lugs 42, for the purpose of engaging the standing stalks. The construction of these gathering devices is similar to those of corn binders now in common use. The conveyors on the left hand side of the machine are operated by means of an inclined shaft 43, while the chain 41 on the opposite side is driven by means of a shaft 44, each of the shafts 43 and 44 being provided with the ordinary sprocket wheels for engaging the chains.

Secured to the back end of the frame 10 I have provided what I shall term a transverse conveyor which comprises an inclined chute 45 having an inclined bottom member 46, the said chute 45 including downwardly extending frame members 214, the lower ends of which are pivotally mounted on a shaft 54, which extends longitudinally through a pair of spaced side plates 57, which are also secured to the back end of the frame members 11 and 12, and form substantially a part of the lower end of the chute 45.

Rotatively mounted in the plates 57, I have provided an ensilage cutter member 58 having a series of blades 59 which are of the type used in machines of this kind. The members 58 are mounted on the shaft 60 above the frame. A cover plate 69 is provided for the upper edges of the plates 57.

An inclined bottom plate 71 is provided at the lower end of the conveyor 48 to receive the ensilage from the cutter member 58 and to deliver it to the elevating conveyor 72, the operation of which will hereinafter be described.

The cutter member 58 is rotated in a counter-clockwise direction by means of the shaft 60, which is extended forwardly and driven from the engine 75. This engine is mounted upon the members 11 and 12, as clearly illustrated in Figures 1 and 2. The back end of the shaft 60 is provided with a fly wheel 76, which serves the purpose of imparting a uniform action to the cutters 59 and assists in taking care of the excessive feeding.

Mounted longitudinally beneath the shaft 60 and beneath the members 57, is a shaft 77, having its forward end provided with a crank wheel 78. This crank wheel 78 is designed to operate the sickle 29 through the connecting rod 79, and is driven by means of a chain 80 operating on a sprocket 81 on the shaft 60, and a sprocket 82 on the shaft 77. The rear end of the shaft 77 is provided with a sprocket 83. The shaft 65 of the beater 64 is extended rearwardly through the back plate 57, and is designed to carry a sprocket 85. The shaft 63 is also extended rearwardly through the back plate 57, and is designed to carry a sprocket 86. The sprockets 85, 86 and 83 are designed to carry a chain 87, thus providing means for the rotation of the beater 64 and the roller 62. The forward end of the shaft 54 is provided with a sprocket 93, while the shaft 60 is provided with a sprocket 94, said sprockets being designed to carry a chain 95, thus providing means for the rotation of the shaft 54, which will in turn cause the conveyor member 48 to be rotated with the upper run traveling downwardly.

Mounted beneath the shaft 60, and slightly to one side, I have provided a shaft 96 designed to have pivotally mounted thereon the inclined conveyor trough 72. The elevator chain 104 of the conveyor 72 is driven by means of the sprockets 103 mounted on a shaft 96. The shaft 96 is rotated by means of a sprocket 201 from a chain 200, which in turn is driven from a sprocket 202 on the shaft 63.

The chute 45 is provided with back plates 73 and 204, and front plates 108 and 207. The plates 204 and 207 form rigid side members so arranged that when the outer end of the chute 45 is lowered to a horizontal position, as shown by dotted lines in Figure 4, the same may be used for the purpose of feeding shocked corn to the cutter at which time the side member 108 may be removed if so desired, so that the corn may be more conveniently fed to the conveyor 48.

The lower end of the chute 45 is pivotally mounted on the shaft 54. The free end of the said chute is supported in its upwardly inclined position by means of braces 208 and 209, the lower ends of each of the said braces being pivoted to the main frame members 16 by pivots 210. The upper ends of the said braces are detachably secured to the chute 45 by pins 211. Similar pins 212 are provided near the outer end of the chute so that the upper ends of the braces 208 and 209 may be detached from the pins 211, and secured to the pins 212, which permits the chute to assume a horizontal position, the braces being secured in position on the pins by cotter pins 213. This provides means whereby the chute may be easily and quickly moved from an inclined position to a horizontal position. When it is moved to a horizontal position, the back plate 73 is detached so that the fodder may be easily fed to the chute 45.

I have found that when but two or three stalks are being fed at a time onto the conveyor 48, a little difficulty is experienced in getting the same to feed uniformly, due to the fact that they do not come into engagement with the beater 64 until a number of them have been piled on the conveyor 48, with the result that a certain amount of slugging takes place. That is, when the pile is built up sufficiently to be engaged by the beater 64, the whole pile will then be fed into the mechanism which has a tendency to overload the cutter.

To overcome this difficulty, I have provided between the side members 214 of the chute 45 a pivoted frame 215. The upper end of the frame 215 is pivoted about a shaft 216. The lower end of the frame 215 is designed to carry a shaft 217 having sprocket wheels 218 designed to engage the under side of the sprocket chains 49.

The conveyor 48 is provided with a few extra links and slats so that it is slightly longer than the previous conveyor, and so that that portion of the conveyor 48 which is opposite the beater 64 may be held upwardly to a point near the said beater, as illustrated in Figure 5. The free end of the frame is held upwardly by securing the upper end of said frame rigidly to the shaft 216, and mounting on the outer end of the shaft 216 a crank 219. The crank 219 is provided with a spring 220, one end of which is adjustably secured to the side frame member of the chute 45 by a bracket 221. The spring 220 is designed to yieldably support the free end of the frame 215 upwardly and to hold that portion of the conveyor 48 which is opposite the sprockets 218 close to the beater 64.

By this arrangement, it will be seen that if a few stalks are delivered to the conveyor 48, they will be immediately brought into contact with the beater 64, and thence fed to the beater 66 and the chopping mechanism 59. If a large number of stalks are delivered to the conveyor 48, it will be seen that their weight together with the pressure applied to them by the beater 64 will permit the bulged portion of the conveyor to be moved downwardly.

It will further be seen that the stalks will be fed uniformly to the chopping mechanism just as they are delivered by the gathering mechanism and any serious slugging prevented.

I have provided means whereby both the gathering chains 40 and the conveyor chains 132 and 133 may be operated at variable speeds relative to the driving shaft 145, operated by a pinion 24a from the internal gear 24 of the bull wheel 23, the two sets of conveyor chains being independently variable with the drive shaft and relative to each other. This provides means whereby if the stalks are not sufficiently straightened up, in case of badly tangled corn, by the gathering chains, they may be further assisted by the conveying chains. This provides greater flexibility and larger control by the operator, so that the machine may be made to meet the various conditions under which it has to operate.

This is accomplished by providing a shaft 222 designed to carry the beveled gears 223 and 224. The beveled gear 224 is provided with an upwardly extending shaft 225 having a universal joint 226 on its upper end. This joint is provided with a shaft 227, the upper end of which carries a sprocket 228 carrying a chain 229, and designed to operate a sprocket 230 secured to the shaft 136.

The shaft 222 is operated through the gears 231 and 232, the said gears being secured together by a sleeve 233 which is splined to the said shaft and free to slide longitudinally thereon, the same being actuated through a grooved collar 234, said collar being operated through any suitable lever mechanism not illustrated in the drawings.

The gear 231 is designed to mesh with a gear 235 secured to the shaft 145, while the gear 232 is designed to be moved into operation with a gear 236 of a smaller diameter than the gear 235.

By moving the sleeve 233 longitudinally on the shaft 222, it will be seen that either set of gears may be brought into operative relation with their respective gears of the shaft 145, and the shaft 222 operated at variable speeds relative thereto. In the drawings I have illustrated only two gears, but any number may be provided giving any number of desired speed relations.

The shafts 43 and 44 are driven from a shaft 147 on which I have provided gears 237 and 238 which are both secured to a sleeve 239, said sleeve being splined to the shaft 147 and free to move longitudinally therewith. The said gears 237 and 238 are designed to mesh with the gears 235 and 236 respectively, so as to operate the shaft 147 at variable speeds relative to the shaft 145.

It will be seen that both the shaft 222 and the shaft 147 may be thrown out of operation with the shaft 145 by moving the sleeves 233 and 239 to a position midway between the two extreme operative movements, in which case none of the gears will be in operation.

I desire, however, to operate the butt conveyor 113 at a fixed speed relation with the shaft 145, as this will give a uniform feeding of the stalks to the chopping mechanism, the stalks being fed by the butt conveyor at the same speed at which they are received by the gathering chains. If the corn is leaning forwardly, then the conveying chains are driven at a speed faster than the butt conveyor, and the upper end of the stalks are moved to an upright position; or if the stalks are leaning rearwardly when received by the conveying chains 132 and 133, they may be run at a slower speed than the speed of the butt conveyor, which will have a tendency to straighten the stalks so that they may be delivered to the inclined transverse conveyor when the stalks are parallel thereto.

By this arrangement it will be seen that either the gathering chains or the conveying chains may be thrown into or out of operative relation with the driving shaft and the variable speeds relative thereto, or the butt conveyor may be thrown into and out of operative relation with said shaft.

Figure 7:
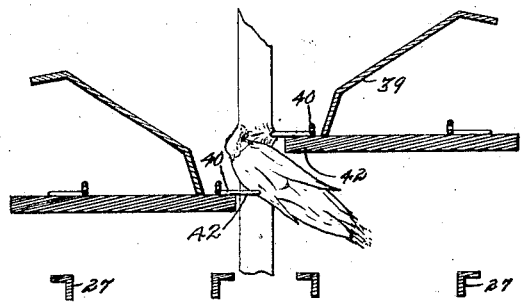
Figure 7 is an enlarged detail, sectional view of a portion of the gathering chains and the frame for mounting the same illustrating the improvements of the same above referred to taken on the line 7—7 of Figure 1.
Figure 6:
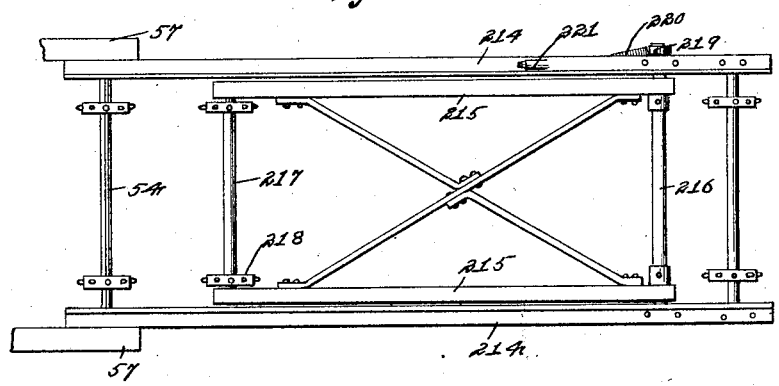
Figure 6 is a detail plan view of the mechanism for controlling the feed end of the inclined transverse conveyor.

In Figure 7 of the drawings, I have illustrated in section the gathering boards 39 and gathering chains 40 which are similar to my previous application with the exception that I elevate one of the gathering boards and the chain carried thereby at a higher elevation than the opposite one so that the inner runs of the chains 40 may be mounted to travel comparatively close to the upstanding stalks, which is very desirable, so that the stalks may be positively engaged by the lugs 42 of the conveyor chains. The lugs of one chain are designed to overlap the lugs of the opposite chain.

By elevating one gathering board above the other, I have provided means whereby ears of corn or other obstacles, which are considerably larger than a corn stalk, and thicker than the horizontal distance between the inner edges of the gathering board, may pass between the two gathering boards and be turned to a substantially horizontal position, as clearly illustrated in the drawings.

I find by this arrangement that I have provided means whereby the stalks may be positively engaged by the gathering chains and will be delivered to the cutter and the conveying chains without slipping between the lugs 42, as is sometimes the case when the conveyor boards are spaced apart such a distance as to permit vertically arranged ears of corn to pass between them.

I have found further that considerable difficulty arises in feeding the stalks from the inclined platform 109 to the transverse conveyor 48, due to the fact that ears of corn will overhang the upper edge of the gathering board 242, illustrated in Figure 1, in a manner similar to that shown by dotted lines in said figure, the stalks being shown in positions 1 and 2. When the stalks have reached the position 2, it will be at that time ready to be delivered longitudinally into the transverse conveyor, and the overhanging ear will catch on the board 242 and holds the stalk against longitudinal movement, in which case it has heretofore been necessary to manually relieve the situation by simply throwing the overhanging ear into the chute.

To overcome this difficulty, I have placed the member 242 in a downwardly and outwardly inclined position, and placed on its upper surface an inclined plate 243, which is arranged diagonally with the upper face of the plate 242, and in a direction that the ear of corn would assume, as shown by dotted lines in position 1. The ear of corn will then engage the inclined plate 243, which will move the ear inwardly and cause it to fall on the inner side of the platform 109, and to be delivered to the chute 45, without preventing longitudinal movement of the stalk after it has entered the chute.

The plate 243 has one end pivoted at 244 and the other end provided with a slotted bracket 245 designed to be secured in position by means of a bolt 246, so that the angle of the plate 243 may be adjusted relative to the member 242 at the will of the operator.

Thus it will be seen that I have provided improvements of such nature as to overcome certain difficulties which have arisen through actual operation of my machine, and which have resulted in producing a machine which is adapted to gather corn and to automatically deliver it to a wagon driven beside the machine, and chop it into short lengths commonly known as ensilage, and which is capable of rapidly delivering and handling the corn whether it be standing in an upright position or badly tangled, and further provide a machine which is adapted to efficiently handle such tall and large plants as sun flowers and sedan grass.

I claim as my invention:

1. In a harvesting machine, a stalk gathering mechanism, a stalk chopping mechanism, means for conveying the stalks from the gathering mechanism and delivering them to the chopping mechanism, means for driving all of said mechanisms, means for varying the speed of the gathering mechanism relative to the speed of the said driving mechanism, and means for varying the speed of the said conveying mechanism relative to the speed of the driving mechanism.

2. In a harvesting machine, a stalk gathering mechanism, a stalk chopping mechanism, means for conveying the stalks from the gathering mechanism and delivering them to the chopping mechanism, means for driving all of said mechanisms, and means for varying the speed of said conveying mechanism relative to the speed of the driving mechanism.

3. In a harvesting machine, a stalk gathering mechanism, a stalk chopping mechanism, means for conveying the stalks from the gathering mechanism and delivering them to the chopping mechanism, said last means including an inclined transverse conveyor, a primary beater and a secondary beater, the said transverse conveyor having one end adjacent to the chopping mechanism and below said beaters, and means for moving a portion of the upper run of said transverse conveyor yieldably toward the said primary beater for the purpose of providing a variable feed space between the run of said conveyor and said primary beater.

4. In a harvesting machine, a stalk gathering mechanism, a stalk chopping mechanism, means for conveying the stalks from the gathering mechanism and delivering them to the chopping mechanism, the last said means including a conveyor, a beater, said conveyor having one end adjacent to the chopping mechanism and below said beater, and means for moving a portion of the upper end of said conveyor yieldably toward the said beater, for the purpose of providing a variable feed space between the run of said conveyor and said beater.

5. In a harvesting machine, a harvester cutter, a stalk conveying mechanism for receiving the stalks from the said cutter, said stalk conveying mechanism including an inclined gathering board, a deflector plate having one end pivotally mounted on said board, and means for adjusting the angle of said deflector plate relative to the movement of the stalks over said board.

6. In a harvesting machine, the combination with a main frame having means for receiving and operating on stalks, of a gathering mechanism comprising a pair of inclined endless belt devices running in opposite directions, one of said belt devices being designed to operate on one side of a row of upstanding stalks and the other belt to operate on the opposite side of said row of stalks, the inner runs of said belts being designed to operate in the same direction, the said runs being spaced apart a distance slightly greater than the diameter of a stalk of corn, the said belts being mounted in substantially parallel planes one above the other such a distance that an ear of corn may pass between the said chains when the said ear has its longitudinal axis in a plane substantially parallel with the planes of said chains.

7. In a harvesting machine, a stalk gathering mechanism, a harvester cutter, a chopping mechanism, a conveying mechanism for receiving the stalks from said gathering mechanism in a vertical position and delivering them to the chopping mechanism in a transverse and inclined position, said mechanism including a closed platform having its delivery end inclined transversely toward said chopping mechanism, a transverse conveyor located beneath the discharge end of said platform to feed the stalks longitudinally to the chopping mechanism, and a deflector plate at the upper end of said inclined platform to deflect overhanging ears of corn onto said platform at a point near the delivery end thereof.

8. In a harvesting machine, a stalk gathering mechanism, a harvester cutter, a chopping mechanism, a conveying mechanism for receiving the stalks from said gathering mechanism in a vertical position and delivering them to the chopping mechanism in a transverse and inclined position, said mechanism including a closed platform having its delivery end inclined transversely toward said chopping mechanism, a transverse conveyor located beneath the discharge end of said platform to feed the stalks longitudinally to the chopping mechanism, a deflector plate at the upper end of said inclined platform to deflect overhanging ears of corn onto said platform at a point near the delivery end thereof, and means for adjusting the angle of said deflector plate relative to the movement of the overhanging ear of corn.

9. In a harvesting machine, a stalk gathering mechanism, a harvester cutter, a chopping mechanism, a conveying mechanism for receiving the severed stalks from said gathering mechanism and delivering them to the chopping mechanism, said conveying mechanism including an inclined gathering board, a deflector plate on the upper surface of said gathering board, and means for adjusting the angle of said deflector plate relative to the movement of the gathered stalks.

10. In a harvesting machine, a stalk gathering mechanism, means for operating on the gathered stalks, means for conveying the stalks from the gathering mechanism and delivering them to the operating means, the last said means including an inclined conveyor, a beater for feeding material to said operating means, and means for yieldably supporting a portion of one run of said inclined conveyor in operative relation with said beater and said operating means.

11. In a harvesting machine, a stalk gathering mechanism, means for operating on the gathered stalks, a conveyor for delivering the gathered stalks to the said operating means, a beater adjacent to said operating means, said conveyor having one end adjacent to the operating means and below said beater, and yieldable means for supporting the delivery end of said conveyor in operative relation with said beater and said operating means.

12. In a harvesting machine, the combination with a main frame having means for receiving and operating on stalks, of a gathering mechanism comprising a pair of inclined endless belt devices running in opposite directions, one of said belt devices being designed to operate on one side of a row of upstanding stalks, and the other belt device to operate on the other side of said row of stalks, the inner runs of said belts being designed to operate in the same direction, said belts being mounted in substantially parallel planes one above the other such a distance that an ear of corn may pass between said planes when the longitudinal axis of the ear of corn is parallel with the planes of said belts.

13. In a harvesting machine, a stalk gathering mechanism, means for operating on the gathered stalks, means for conveying the stalks from the gathering mechanism and delivering them to the operating means, the last said means including an endless conveyor, and means for yieldably supporting a portion of one run of said conveyor in operative relation with said operating means, whereby the space between the movable portion of said conveyor and said operating means may be varied to accommodate materials of various thicknesses being fed to said operating means.

14. In a harvesting machine, a stalk gathering mechanism, means for operating upon the gathered stalks, means for conveying the stalks from the gathering mechanism to said operating means, means for driving all of said mechanisms, means for varying the speed of said conveying mechanism relative to the speed of the driving mechanism, said conveying means including an endless conveyor and a beater for feeding material to said operating means, and means for yieldably supporting a portion of one run of said endless conveyor in operative relation with said beater and said operating means.

15. In a harvesting machine, a stalk gathering mechanism, means for operating on the gathered stalks, means for conveying the stalks from the gathering mechanism and delivering them to said operating means, means for driving all of said mechanisms, and hand actuated means for varying the speed of said conveying means relative to the speed of the driving mechanism, and the means for operating on the gathered stalks.

Des Moines, Iowa, March 19, 1923.

WILLIAM B. THIEMANN.